F. A. NELSON.
FLUID PRESSURE CONTROLLING VALVE.
APPLICATION FILED MAR. 10, 1908.
917,345.
Patented Apr. 6, 1909.
2 SHEETS—SHEET 1.
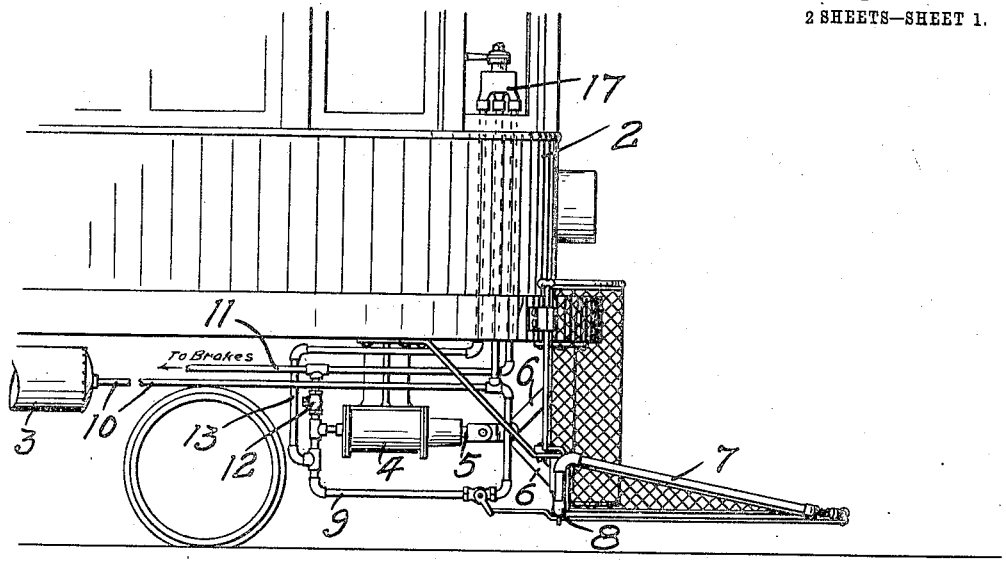
Fig 1.
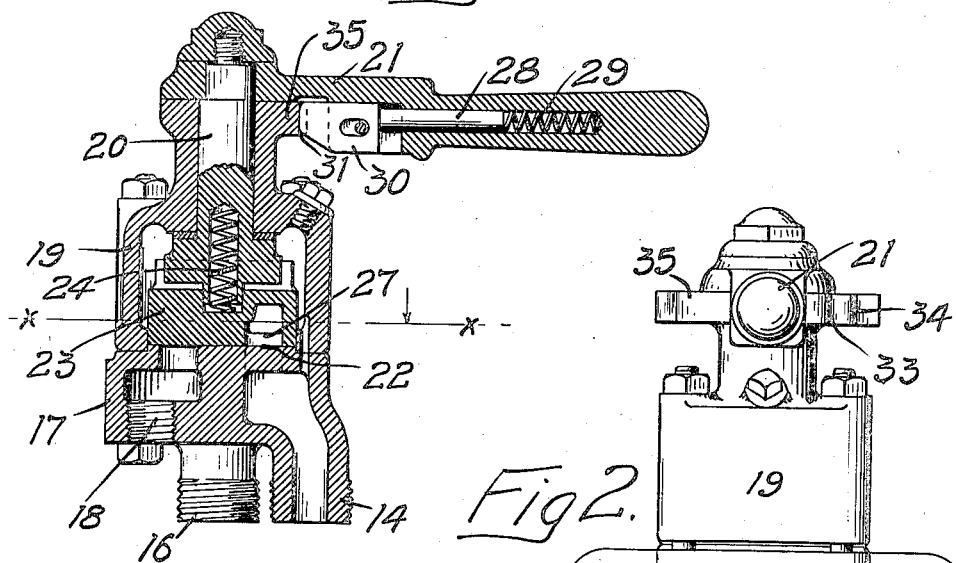
Fig 3.    Fig 2.
WITNESSES
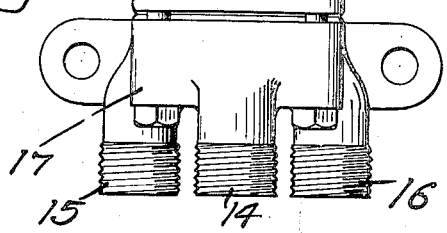
INVENTOR
FRANK A. NELSON
BY Paul & Paul
HIS ATTORNEYS F. A. NELSON.
FLUID PRESSURE CONTROLLING VALVE.
APPLICATION FILED MAR. 10, 1908.
917,345.
Patented Apr. 6, 1909.
2 SHEETS—SHEET 2.
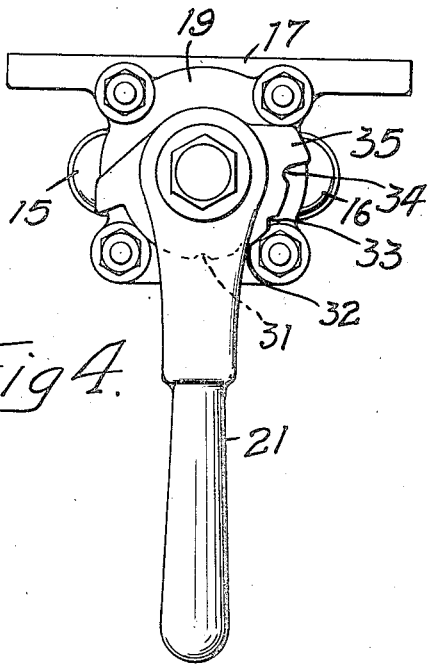
Fig 4.
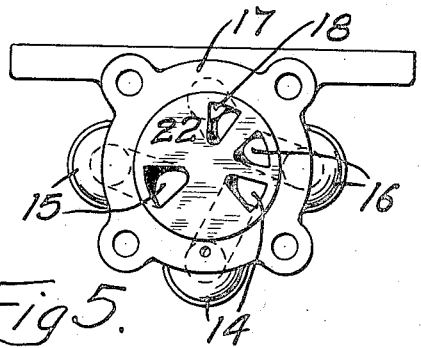
Fig 5.
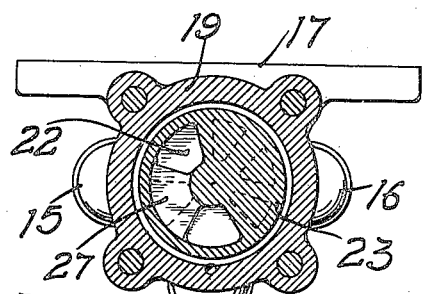
Fig 6. x-x
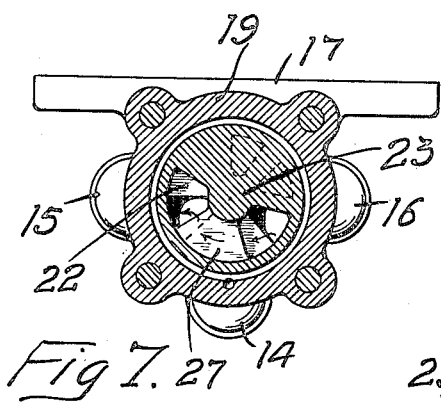
Fig 7.
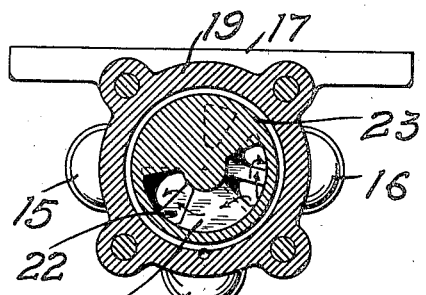
Fig 8.
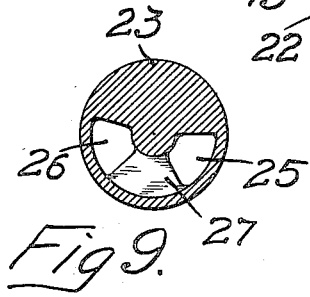
Fig 9.
WITNESSES
M. Walstrom
J. A. Byington
INVENTOR
FRANK A. NELSON
BY Paul & Paul
HIS ATTORNEYS

UNITED STATES PATENT OFFICE.

FRANK A. NELSON, OF MINNEAPOLIS, MINNESOTA, ASSIGNOR, BY DIRECT AND MESNE ASSIGN-
MENTS, TO AMERICAN AUTOMATIC FENDER COMPANY, OF MINNEAPOLIS, MINNESOTA,
A CORPORATION OF MINNESOTA.

FLUID-PRESSURE-CONTROLLING VALVE.

No. 917,845.  Specification of Letters Patent.  Patented April 6, 1909.

Application filed March 19, 1908. Serial No. 430,168.

*To all whom it may concern:*

Be it known that I, FRANK A. NELSON, of Minneapolis, Hennepin county, Minnesota, have invented certain new and useful Improvements in Fluid-Pressure-Controlling Valves, of which the following is a specification.

My invention relates to valves for controlling fluid pressure, and the object of the invention is to provide a valve adapted particularly for use with the brake and fender mechanism of a car, whereby the operation of the brakes and the movement of the safety fender can be quickly and positively controlled.

A further object is to provide a valve by means of which the driver of the car can operate the brakes to set or release them, independently of the fender, or raise or lower the fender to set it in its inoperative or operative position simultaneously with the movement of the brakes.

The invention consists generally in various constructions and combinations, all as hereinafter described and particularly pointed out in the claims.

In the accompanying drawings, forming part of this specification; Figure 1 is a side elevation of the forward portion of a car illustrating my invention applied thereto. Fig. 2 is a detail outside view of the controlling valve. Fig. 3 is a vertical sectional view through the valve and its operating lever. Fig. 4 is a top view of the valve.
Fig. 5 is a detail view illustrating the lower casting of the valve and the arrangement of the ports therein. Fig. 6 is a sectional view on the line x—x of Fig. 3 illustrating the position of the valve when the brake cylinder port is closed. Fig. 7 is a similar view illustrating the position of the port when the fluid pressure is on the brake cylinder. Fig. 8 is a similar view illustrating the position of the valve when the fluid pressure is on the brake cylinder and the mechanism for operating the fender. Fig. 9 is a detail view of the valve disk.

In the drawing, 2 represents a car, 3 a fluid pressure tank and 4 a cylinder suspended under the car and having its piston 5 connected by operating bars 6 with a fender 7 that is hinged at 8 on the front of the car. The operation of this fender is substantially the same as the one shown in my pending ap-
plication for United States patent filed December 23, 1907, Serial No. 407,626, and no further illustration or description thereof is required.

A pipe 9 leads from one end of the cylinder 4 and communicates with a fluid pressure supply pipe 10. A brake service pipe 11 is connected with the pipe 9 and a check valve 12 is provided in the pipe 9 between its point of connection with the brake service pipe 11 and the cylinder 4. A pipe 13 is connected with the pipe 9, and the pipes 10, 11 and 13 extend up into the car and are connected to nipples 14, 15 and 16 on the base portion 17 of the controlling valve which has ports communicating with said nipples, and is also provided with an exhaust port 18. A casing 19 is mounted on the base 17 and carries a stem 20 provided with an operating handle 21. A seat 22 is provided on the top of the base portion 17 and having ports therein communicating with the passages leading to the nipples 14, 15 and 16, and a disk is mounted on the lower end of the stem 20 and yieldingly held in contact with the seat 22 by a compression spring 24. This disk is provided with ports 25 and 26 therethrough and with a web 27 over which a communicating passage is formed between the ports 25 and 26. The operating handle is provided with a plunger 28 engaged by a compression spring 29 and carrying a dog 30 that is adapted to enter recesses 31, 32, 33 and 34 provided in the edge of a flange 35 on the casing 19. By the adjustment of this operating lever the disk 23 may be rotated on its seat and the fluid pressure admitted to the brake cylinder or to the brake cylinder and the fender simultaneously.

The fluid pressure may be admitted to the brake cylinder and held there if desired, by the simple adjustment of the operating lever, and in case of emergency can be set to allow the fluid pressure to simultaneously enter the brake and fender cylinders to set the brakes and drop the fender to an operative position.
When the lever is thrown toward the left until the ports in the disk 23 register with the brake supply pipe port and the exhaust port, fluid pressure will be relieved in the brake cylinder and the brakes released, and the port 22' will lap the fender service pipe port and release the fender cylinder also.

With this valve the driver of the car can have absolute and immediate control over the setting or releasing of the brakes and the adjustment of the fender to an operative or inoperative position.

I claim as my invention:

1. The combination, with a car, of a fluid pressure supply tank, a brake service pipe, a fender adapted to be raised and lowered, a fluid pressure fender cylinder having operative connections with said fender and a controlling valve communicating with said fluid pressure tank, said brake service pipe and said fender cylinder, and adapted when moved in one direction a predetermined distance to admit fluid pressure to said brake service pipe whereby the brakes will be operated independently of the fender or when moved a limited distance in the same direction to admit fluid pressure to said brake service pipe and said fender cylinder, whereby the brakes and the fender will be operated simultaneously.

2. The combination, with a car, of a fluid pressure supply tank, a brake service pipe, a fender hinged at its rear end and adapted to swing vertically to raise or lower its forward end, a fluid pressure fender cylinder having a piston and operative connections between said piston and said fender, a controlling valve having pipe connections with said fluid pressure tank, said brake service pipe and said fender cylinder and adapted when moved in one direction a predetermined distance to admit fluid pressure to said brake service pipe to set the brakes independently of movement of the fender or when moved still farther in the same direction to admit fluid pressure to said brake service pipe and said fender cylinder simultaneously whereby the brakes will be set and the fender lowered with one operation of the valve.

3. The combination, with a car of a fluid pressure supply tank, a brake service pipe, a fender hinged at its rear end, a fluid pressure fender cylinder, a piston therefor, means operatively connecting said piston with said fender and adapted when operated to oscillate said fender and raise or lower its forward end, a controlling valve having a centrally arranged pipe connecting it with said fluid pressure tank and with said brake service pipe and said fender cylinder, and said valve being adapted when moved in one direction a predetermined distance to admit fluid pressure to said brake service pipe to operate the brakes independently of said fender mechanism or when moved still farther in the same direction, to admit fluid pressure to said brake service pipe and said fender cylinder simultaneously, whereby the brakes will be set and the fender lowered with one operation, and said valve having an exhaust port arranged to communicate with said brake service pipe and said fender cylinder when said valve is moved a predetermined distance in the opposite direction, substantially as described.

In witness whereof, I have hereunto set my hand this 2nd day of March, 1908.

FRANK A. NELSON.

Witnesses:
J. H. BALDWIN,
RICHARD PAUL.